June 22, 1965   R. STRYK ETAL   3,190,759

PROCESS FOR MAKING STERILIZED SAUSAGE PACKAGES

Filed Oct. 13, 1960

INVENTORS
Rudolf Stryk &
Gerhard Müller

BY Connolly and Hutz

ATTORNEYS 3,190,759
PROCESS FOR MAKING STERILIZED
SAUSAGE PACKAGES
Rudolf Stryk, Wiesbaden-Biebrich, and Gerhard Müller, Kelkheim-Munster, Germany, assignors to Kalle Aktiengesellschaft, Wiesbaden-Biebrich, Germany, a corporation of Germany
Filed Oct. 13, 1960, Ser. No. 62,494
Claims priority, application Germany, Oct. 14, 1959, K 388,971
5 Claims. (Cl. 99—187)

This invention is directed to a novel process of preparing sterilized sausage packages. In today's selling management, especially in self-service shops, transparent packages are preferred to others because they enable the customer to judge the packed goods by their appearance. Cooked sausages, such as those of the Vienna or frankfurter type, are therefore frequently offered in glass vessels. Such vessels are likely to be damaged by breakage, and moreover their useful load is small as compared with their dead weight. Further, sterilizing sausages packed in glass containers requires addition of brine, i.e., of diluted common salt solution which further increases the dead weight. Moreover, after some time, the sausages will become excessively extracted by the added brine.

Because of these reasons, bags of thermoplastic films have been used for packaging sausages instead of glass containers and thus considerable weight was saved, but the application of brine and its unfavorable effect upon the sausage had to be tolerated as before. On principle, it is not difficult to pack sausages in plastic bags without the addition of brine, or with only so little brine added as is required for maintaining the humidity of the sausages. In this case, the air must be removed from the bags before they are hermetically closed and then sterilized, which usually is performed in a counterpressure autoclave. However, the thus obtained sausage packages containing little or no brine have the disadvantage that wrinkles appear in the walls of the bags cross-wise of the sausages after sterilization with hot water or steam, even under counter-pressure. This so impairs the appearance of the sausage packages that they are hard to sell.

An object of the present invention is a process for making sterilized packages of sausages which avoids the above described disadvantages. In the process according to the invention, the sausages are likewise put into bags of a plasic film and the bags are likewise exhausted of practically all air, hermetically sealed, and heated in a counter-pressure autoclave. The invention consists in the additional application of a squeeze pressure by mechanical means upon the package of sausages, which are practically empty of air and hermetically sealed, while the package is heated in the counter-pressure autoclave.

Figure 1:
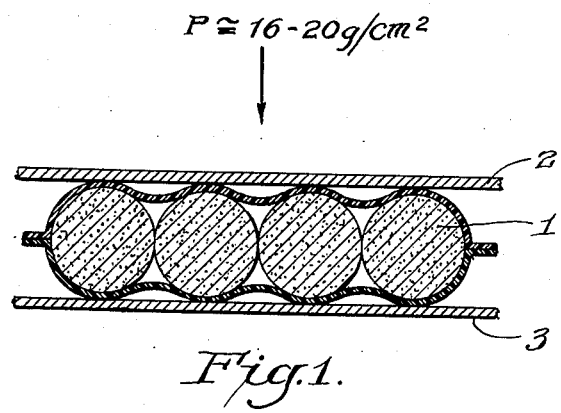
Figure 2:
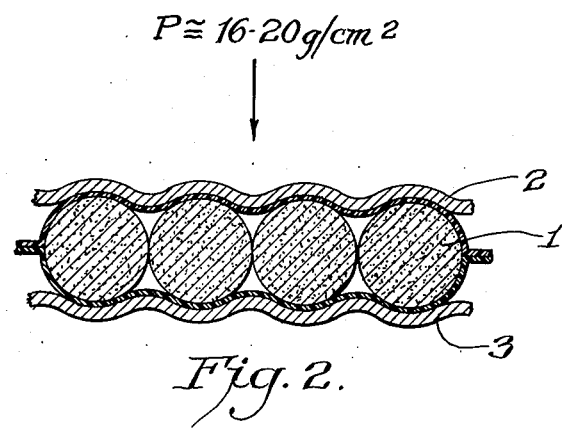

FIGURES 1 and 2 serve for illustration of the process according to the invention. FIG. 1 shows a cross-section through a package of sausages which is squeezed between two platens. FIG. 2 shows the same except that corrugated platens are used.

In the process of the invention, sausages are put into a bag of plastic film which is of suitable dimensions to be filled out by the desired number of sausages. Thereafter, the bag is exhausted of air and closed by welding. It is then put together with other packages of sausages made in the same manner into a counterpressure autoclave in which the bags are sterilized at high temperatures, mostly at temperatures above 90° C. The upper limit for the temperatures applied lies generally at 114–115° C., although the bags would stand even higher temperatures, e.g., 121° C. During sterilization, the walls of the bag are exposed to a mechanical squeeze pressure such that the walls press the sausages between them. For this purpose, the package 1 of sausages is put between the two platens 2 and 3, and the upper platen 2 is loaded by putting a weight on it. A relatively low pressure per square inch, which may be low enough as to cause practically no flattening of the sausages, is sufficient to avoid the objectionable appearance of wrinkles in the bag during the sterilization procedure. The platens 2 and 3 may be, e.g., metal sheets. Suitably, sheets are used which are corrugated to fit better the round shape of the sausages (see FIG. 2). If desired, the bags may be laid in several superimposed layers between the platens. In such case, it is useful to superimpose the bags orderly so that the sausages of the various bags are arranged in one direction.

The duration of sterilization depends, among other factors, on the level of the applied temperature. Usually, this level is between 98 and 113° C., but temperatures up to 121° C. or even more may also be used. Either, no brine is introduced into the bag or, in order to compensate for the humidity loss of the sausages during their previous smoke treatment, at most 5 percent by weight of brine, based on the weight of all of the sausages enclosed, are added.

In the process of the invention, the bags used are made of a thermoplastic which, at the temperature of sterilization, is resistant to water and steam and does not shrink or at least shrinks but insignificantly. Moreover, the plastic films used must have a certain minimum mechanical stability, e.g., films of polyesters of terephthalic acid have proved suitable, such as polyethylene terephthalate, also films of polyesters of terephthalic acid laminated to or coated with a film or a layer of a polyolefin, also films of polyamides, such as the polyamide from ω-undecanoic acid.

*Examples*

(1) Into a flat bag made from a composite film of a polyester of terephthalic acid and high-pressure polyethylene there are placed six sausages which may be scalded and, if desired, cured, and the bag is air-tightly closed by sealing while at the same time the bag is exhausted of air. Owing to the exhaustion, the walls of the bag join closely to the sausages. An aluminum sheet which about corresponds to the size of the filled bag is put into a counterpressure autoclave containing water, the bag is placed on this sheet, and superimposed by another aluminum sheet which is then loaded by putting weights thereon, so that the pressure of the upper platen upon the package is, on an average, about 16 to 20 gs. per cm.$^2$. The autoclave is closed and air is pressed into it through an air inlet, so that during the period of sterilization an overpressure will be maintained which is about 0.5 at. higher than the vapour pressure of the water at sterilization temperature. The air inlet is shut and the autoclave is then heated up to 105° C. by feeding into the water contained therein superheated steam, and kept at this temperature for 20 minutes. The above noted superatmospheric pressure is retained as long as the temperature has not yet dropped below 40° C. After the autoclave has completely cooled down and the excess pressure has been blown off, the package of sausages is taken from the autoclave. The walls of the bag of the thus sterilized package of sausages join closely to the sausages without showing any wrinkles.

(2) Flat bags of a polyamide made from ω-aminoundecanoic acid—a polyamide which is on the market under the trade name of "Rilsan"—are filled each with 10 cooked and cured sausages, and then treated as described in Example 1, with the exception that five superimposed bags are brought between the two aluminum platens.

It will be obvious to those skilled in the art that many modifications may be made within the scope of the present invention without departing from the spirit thereof, and the invention includes all such modifications.

What is claimed is:

1. A process for making a sterilized package of sausages which comprises heating sausages which are bagged in a substantially exhausted, sealed thermoplastic bag in side-by-side relation to a temperature of about 90 to 121° C. for a time sufficient for sterilizing the sausages and at an external air pressure higher than the vapor pressure of the water at sterilizing temperature and exposing the walls of the bag to a mechanical squeezing pressure of at least 16 gs. per cm.$^2$ during said heating such that the walls press the sausages between them, the bag being of a thermoplastic which, under the conditions of said heating, resists water and steam and also does not shrink substantially.

2. The process of claim 1 wherein the bag is composed of a thermoplastic material of the group consisting of polyethylene terephthalate, a polyamide derived from ω-aminoundecanoic acid and a laminate of polyethylene terephthalate and polyolefine.

3. The process of claim 1, wherein the bag is made of a composite film of polyethylene terephthalate and high-pressure polyethylene.

4. Process of claim 1 wherein the package is squeezed between two rigid sheets.

5. Process of claim 1 wherein several of the bags having sausages bagged in are pressed while arranged in superimposed relationship.

References Cited by the Examiner

UNITED STATES PATENTS

| 2,424,536 | 7/47 | Mayer et al. |
| 2,473,041 | 6/49 | Urbain et al. |
| 2,964,889 | 12/60 | Oelze et al. _____ 99—174 X |

FOREIGN PATENTS 805,985  12/58  Great Britain.

OTHER REFERENCES

"Refrigerating Engineering," February 1954, page 46, article entitled Packaging and Wrapping Materials.

A. LOUIS MONACELL, *Primary Examiner.*

ABRAHAM H. WINKELSTEIN, HYMIN LORD,
*Examiners.*